(12) United States Patent
Kashitani

(10) Patent No.: US 6,297,804 B1
(45) Date of Patent: Oct. 2, 2001

(54) POINTING APPARATUS

(75) Inventor: Atsushi Kashitani, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/373,645

(22) Filed: Aug. 13, 1999

(30) Foreign Application Priority Data

Aug. 13, 1998 (JP) ................................................ 10-228464

(51) Int. Cl.$^7$ ....................................................... G09G 5/08
(52) U.S. Cl. ........................................... 345/157; 345/158
(58) Field of Search ..................................... 345/156, 157, 345/158, 145, 169, 179, 180, 182, 183, 7, 339, 351

(56) References Cited

U.S. PATENT DOCUMENTS

| 5,712,658 | * | 1/1998 | Arita et al. ............................ 345/158 |
| 5,917,490 | * | 6/1999 | Kuzunuki . | |

FOREIGN PATENT DOCUMENTS

| 62-74119 | 4/1987 | (JP) . |
| 62-129886 | 6/1987 | (JP) . |
| 3-43788 | 2/1991 | (JP) . |
| 5-25763 | 2/1993 | (JP) . |
| 5-083705 | 4/1993 | (JP) . |
| 6-149202 | 5/1994 | (JP) . |
| 6-266498 | 9/1994 | (JP) . |
| 7-152490 | 6/1995 | (JP) . |
| 7-168949 | 7/1995 | (JP) . |
| 9-046776 | 2/1997 | (JP) . |
| 9-237349 | 9/1997 | (JP) . |
| 9-319556 | 12/1997 | (JP) . |

OTHER PUBLICATIONS

Wellner et al.; "Computer–Augmented Environments"; Communications of the ACM; vol. 36, No. 7; Jul. 1993; pp. 24–97.

Machii et al.; "An Intuitive User Interface Which Utilizes User's Actions in the Real World"; ITE Technical Report; vol. 19, No. 65; Nov. 1995; pp. 1–6. No Translation.

* cited by examiner

Primary Examiner—Regina Liang
(74) Attorney, Agent, or Firm—Foley & Lardner

(57) ABSTRACT

The present invention provides a precise, easy to understand pointing apparatus. It allows users to point both to a position on a display on which virtual world information is displayed and to real objects in the real world with one pointing device to increase productivity. The pointing apparatus comprises, for example, a light pointer capable of projecting a desired-shaped pointer light beam on a real object in the real world, such as a document or a three-dimensional object, at a desired position or in a desired direction, a display on which virtual world objects such as a graphical user interface or electronic data are displayed, a pointing device allowing the user to point to a desired position, and a boundary detection sensor detecting the position of the real object and sensing the boundary between the real object and the display area of the display. The pointing apparatus displays a cursor when the user points to a position on the display, while it displays the pointer light when the user points to the real object. This ability allows the user to point to both a position in the virtual world and a position in the real world with one pointing device.

10 Claims, 11 Drawing Sheets

POINTING APPARATUS

FIELD OF THE INVENTION

The present invention relates to a pointing apparatus, and more particularly to a pointing apparatus which allows users to point to an object and to specify coordinates while moving freely between the virtual space displayed on a display and the real world space in which real objects exist.

First, an overview of the present invention will be described. The pointing apparatus according to the present invention allows the user to point not only to objects in the virtual world displayed on the display but also to objects in the real world, such as documents or three-dimensional objects. That is, the present invention relates to an user interface, called "Augmented Reality", created by combining (or making continuously) the real world with the virtual world.

BACKGROUND OF THE INVENTION

The description of the related art of the present invention begins with the description of "Augmented Reality", followed by the description of related known arts.

"Augmented Reality" (hereinafter called "AR"), a concept introduced in 1993, is described, for example, in Document (1), "Communications of the ACM" Vol. 36, No. 7. PP. 24–97.

In contrast to "Virtual Reality" in which all the real world objects are realized virtually, AR augments the real world with computers to realize an easy-to-understand interface.

Among the systems designed based on AR, "Digital Desk" and "InteractiveDESK" are related to the present invention. They are described below.

"Digital Desk" is an interactive desktop system proposed by Pierre Wellner of Rank Xerox corporation. The concept is detailed, for example, in Document (2) "Communications of the ACM" Vol. 36, No. 7, pp. 87–96. As shown in FIG. 8, this system has a projector 202 and a camera 201 above a work desk 203. The projector 202 projects images, generated by a computer 200, onto the work desk 203 (see a projected image 204), and the camera 201 takes pictures of hand motions, hand-written characters, hand-written pictures, and documents. The user can perform tasks interactively while conversing with the computer 200 through the work desk 203 on which the images generated by the computer 200 and real documents are mixed. The so-called real world interface is thus realized. Applications are available which illuminate, and display marks on, the numbers in a document pointed by a finger and paste those numbers on a desktop calculator created by the projected light.

Patent documents related to "Digital Desk" of Rank Xerox corporation include Japanese Patent Publication Kokai JP-A No. Hei 7-168949 (Title of invention "Interactive Copier") and Japanese Patent Publication Kokai JP-A No. Hei 9-237349 (Title of invention "Interactive Desktop System").

Of these patent publications, Japanese Patent Publication Kokai JP-A No. Hei 7-168949 (Title of invention "Interactive Copier") discloses a configuration, comprising a a video projector displaying virtual world information onto a work desk and a camera monitoring the work desk. The disclosed configuration is designed to allow the user to interact with information projected by the video projector and to create documents or pictures on actual paper in the manual operation mode. Thus it enables an interaction between virtual world images, projected by the video projector, and real world paper on the work desk to be performed intuitively in the manual operation mode.

Japanese Patent Publication Kokai JP-A No. Hei 9-237349 (Title of invention "Interactive Desktop System") also discloses a configuration comprising a video projector displaying virtual world information onto a work desk and a camera monitoring the work desk. This configuration allows the user to request the camera to take the picture of real objects, to display via the computer images taken by the camera onto the video projector, and to copy and paste real objects such as documents while sitting at the work desk. In this configuration, a mouse is used to specify an area to be photographed, and the cursor which is a pointing position indicator is projected on the work desk as the display information from the video projector.

The concept and the features of "InteractiveDESK", a system which uses the entire desk as the interactive environment, are detailed, for example, in Document (3), ITE Technical Report Vol. 19, No. 65, pp. 1–6.

FIG. 9 is a decigram showing an overall configuration of InteractiveDESK. As shown in FIG. 9, the InteractiveDESK comprises a work desk 304 whose working surface is a large display through which data may be entered with a pen, an upright display 302 provided in front of the user, a camera 301 monitoring the top of the work desk, and other components such as a keyboard 306 and a mouse 307. The camera 301 recognizes user actions or the positions of documents on the desk and helps the user with his or her work. For example, it switches input means (keyboard 306, mouse 307, or pen) between two types of displays, desk built-in type and the upright type, and extracts electronic information on the paper documents on the desk.

Japanese Patent Publication Kokai JP-A No. Hei 6-266498 (Title of Invention: Data Processing System) is available for a patent application publication relating "InteractiveDESK". Japanese Patent Publication Kokai JP-A No. Hei 6-266498 mentioned above discloses a method for determining a position at which desired information is to be displayed based on at least one of the three: user status, display surface status, and display status.

For example, when documents or some other objects are placed on the display screen, this system displays information at a position where there is no such objects to prevent real world objects such as documents from interfering with the virtual world such as display information. The publication also discloses a method for switching the display with the above-described input means.

Other prior arts similar to "Digital Desk" or "InteractiveDESK" include Japanese Patent Publication Kokai JP-A No. Hei 9-319556 (Title of Invention: Data Processing Device). This publication discloses a system comprising a work desk, a projector projecting images on the work desk, and a camera monitoring the desk and a technology for interacting with real world objects such as documents on the desk. However, there is no distinct difference between the system disclosed in this publication and those systems described above such as "Digital Desk" or "InteractiveDESK". Thus, explanation on the system of Japanese Patent Publication Kokai JP-A No. Hei 9-319556 is obtained herein.

The technologies for pointing to real world objects with laser beam, such as those disclosed in Japanese Patent Publication Kokai JP-A No. Hei 9-46776 (Title of Invention: Remote Indication Device and Method) and Japanese Patent Publication Kokai JP-A No. Hei 5-83705 (Title of Invention: Still Picture Input Device) are outlined below.

FIG. 10 shows the configuration of the remote indication device proposed by Japanese Patent Publication Kokai JP-A No. Hei 9-46776. An indication device 400 and a remote unit 406 are connected via a network 405. The remote unit 406 takes a picture of a document 407 at a remote location and sends the image to the indication unit 400 over the network 405. The indication device 400 displays the image of the document sent from the remote unit 406 onto a display 401. The presenter points to a desired position on the remotely-located document on the display 401 with a keyboard 402 or a mouse 404 connected to the indication device 400. The pointing information is sent to the remote unit 406 via the network 405. In response to the pointing information sent from the indication device 400, the remote unit 406 projects laser beam onto the actual position on the document 407 corresponding to the position pointed by the presenter on the display 401.

FIG. 11 shows the configuration of the still image input device disclosed in Japanese Patent Publication Kokai JP-A No. Hei 5-83705 described above. This device is a pointing apparatus in a pictorial art camera used to present materials to a TV conference. The user operates a pointing device 505 to send pointing information to a CPU 501. In response to the received pointing information, the CPU 501 controls a laser beamemitting device 503 to project laser beam onto a document desk 504. This enables a presenter of a conference to point to actual objects such as conference materials. This technology has an image read instruction area previously allocated on the document desk so that a camera 502 can read an image in the area when the user points it and clicks in it with laser beam.

As the technology for pointing to a desired position with laser beam, laser pointers for presentation are known and many are commercially available. These are used by presenters to indicate images projected by a projector. Pen-sized pointers have been developed.

DISCUSSION ON THE BACKGROUND ART

The following analysis and discussions represent the problems encountered during the course of investigations toward the present invention. These discussions underlie the setting of the specific purpose or objects of the present invention.

"Digital Desk" and those disclosed in the related publications such as Japanese Patent Publication Kokai JP-A No. Hei 7-168949 and Japanese Patent Publication Kokai JP-A No. Hei 9-237349 project images on a work desk with a projector, respectively. Therefore, an image is projected not only on the it work surface of the desk but also on real world objects such as documents. This method allows the cursor, displayed as a projected image, to point to both the projected virtual world and the real world objects.

However, existing projectors cannot project high-quality images of such complex virtual world screens as graphical user interfaces.

Displaying high-quality screens such as graphical user interface screens requires a special high definition display. Japanese Patent Publication Kokai JP-A No. Hei 7-168949 and Japanese Patent Publication Kokai JP-A No. Hei 9-237349 do not mention this fact.

Most frequently, computer users perform word processing, presentation material creation, or networking exclusively in the virtual world. Even if a high definition projector is developed, it is very questionable whether the user can do exclusively those virtual world tasks in videos projected on the work desk.

For the pointing task pointing to projected images, the above publications describe only a task in which the camera recognizes a position pointed by the user with his own finger for interaction with the computer. They describe neither a pointing method nor a pointing device for pointing to both the high definition display and the projector image seamlessly in one operation.

In contrast, the display unit used in InteractiveDESK, and disclosed in Japanese Patent Publication Kokai JP-A No. Hei 6-266498 related therewith, comprises two types of displays, that is, a built-in display built in the work surface of the desk and an upright display provided in front of the user. The display also has a keyboard and a pointing device. However, the desk-built-in display requires the user to point to a position on the display surface with a pen and to enter data into the upright display with a keyboard or a mouse. Japanese Patent Publication Kokai JP-A No. Hei 6-266498 does not describe a method for allowing the user to enter data into the upright display and the desk-built-in display seamlessly with a single pointing device, a method for pointing to the upright or desk-built-in display and to a real world object seamlessly, or a pointing device. This publication discloses a method for automatically switching between the displays according to the input means to be used to allow the user to select an interface he or she wishes, i.e., aiming at providing a user-interface convenient for the user. However, the disclosed method requires the user to change the input means according to the display he or she wants to use or to move the keyboard.

The technology described in Japanese Patent Publication Kokai JP-A No. Hei 9-319556 also has the same problem as that of "Digital Desk" and "InteractiveDESK" described above.

On the other hand, the technology disclosed in above-described Japanese Patent Publication Kokai JP-A No. Hei 9-46776, one of technologies for pointing to a real world object with laser beam, only displays the cursor in a position pointed by the display in the indication device and projects a laser beam at a corresponding position in a remote document. The technology does not allow the user to seamlessly point to a virtual world on the display and a real world outside the display. As a matter of fact, the technology does not take such a concept into consideration at all.

The technology disclosed in Japanese Patent Publication Kokai JP-A No. Hei 5-83705 also allows the user only to point to a position on the document desk with a pointing device. A display for displaying virtual world information is not provided, nor does the publication describe the method or concept of pointing to the virtual world and to a document desk in the real world.

As described above, both Japanese Patent Publication Kokai JP-A No. Hei 9-46776 and Japanese Patent Publication Kokai JP-A No. Hei 5-83705 use a laser beam to point to real world objects such as documents but do not take into consideration the ability to point seamlessly to the real world and virtual memory. Nor is the presentation laser pointer designed to do so.

SUMMARY OF THE DISCLOSURE

The present invention generally seeks to solve the problems associated with a prior art described above. It is an object of the present invention to provide a pointing apparatus which allows the user to directly point not only to a virtual world displayed on a display unit but also to real world objects such as documents or three-dimensional objects in the real world.

According to one aspect of the present invention, there is provided a novel pointing apparatus. The pointing apparatus comprises a light pointer projecting a desired-shaped light beam on a position on an object; a display unit on which desired information is displayed; a pointing device of pointing to a desired position on a display screen of the display unit; and a data processing unit controlling the light pointer, the display unit and the pointing device. Here, when the position pointed by the pointing device is in a display area of the display unit, the pointing apparatus displays a cursor at the pointed position in the display area of the display unit and, when the position pointed by the pointing device is in an area other than the display area of the display unit, the pointing apparatus controls the light pointer to project the desired-shaped light beam to the pointed position.

THE BRIEF DESCRIPTION OF THE DRAWINGS

PREFERRED EMBODIMENTS OF THE INVENTION

Figure 1:
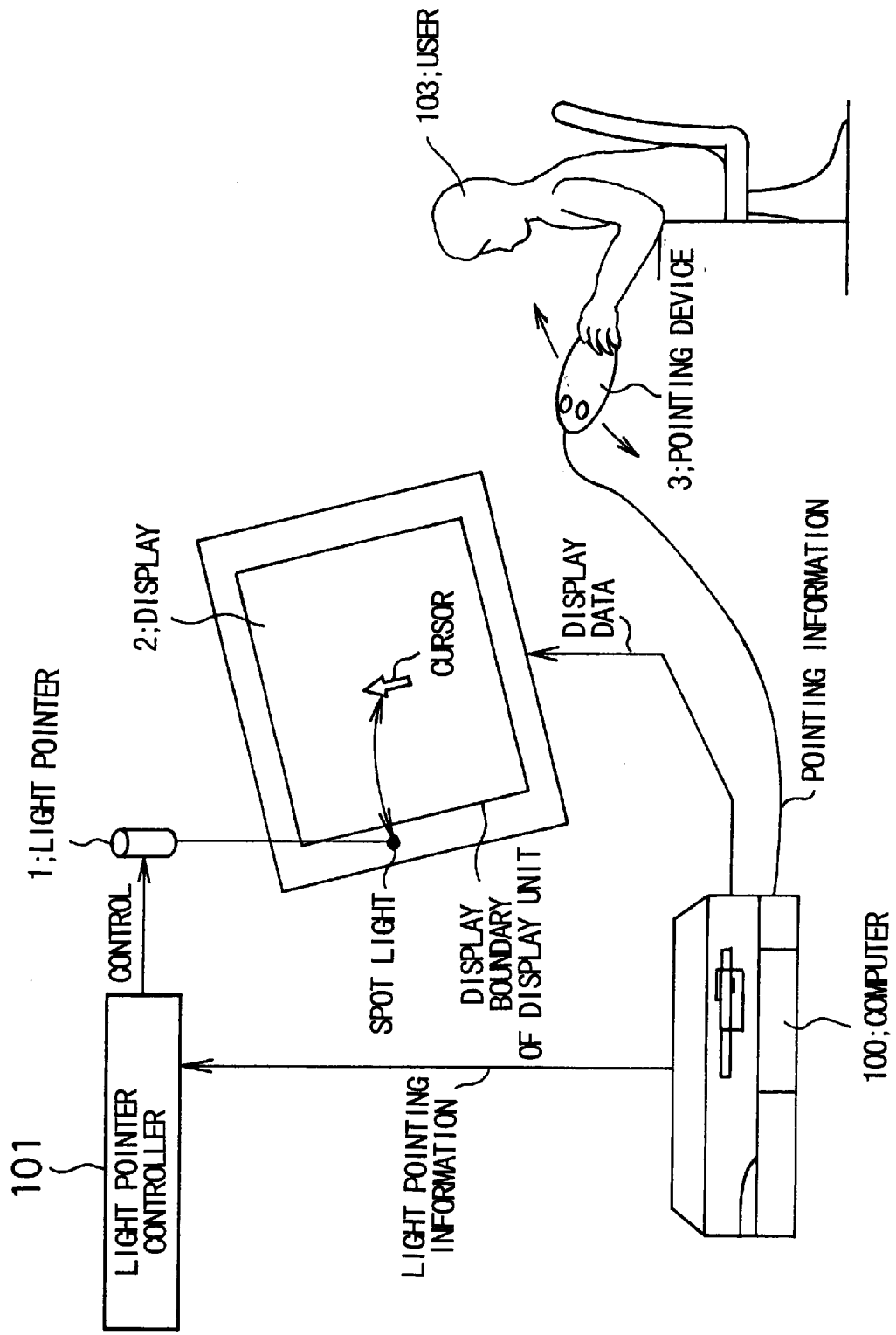
FIG. 1 is a diagram showing the configuration of a first embodiment of the present invention.

Some preferred embodiments of the present invention will now be described more in detail. A preferred embodiment of the present invention comprises a light pointer capable of projecting a desired-shaped pointer light beam on a real object in the real world at a desired position or in a desired direction, a display unit on which virtual world objects such as a graphical user interface or electronic data are displayed, with a pointing device allowing the user to point to the desired position. The pointing apparatus displays a cursor when the position pointed by the user is in the display area on the display unit, while it irradiates (projects) the pointer light beam when the position pointed by the user is not in the display area. This ability allows the user to point to both a position in the virtual world and a position in the real world with one pointing device.

In one embodiment, there is provided with a preset sub-area defined in the display area on the display unit. The pointing apparatus displays the cursor when the user points to a position within the sub-area, and projects the pointer light beam when the user points to a location outside the sub-area.

In addition in another embodiment, the pointing apparatus also comprises a boundary detection sensor detecting the boundary between the real object and the display area on the display unit for use when a real object in the real world overlaps with the display area on the display unit. When the user points to a position on the display, the pointing apparatus displays the cursor; when the user points to a position in the real object, the pointing apparatus projects the pointer light beam onto the real object.

In a further embodiment, there is provided with a camera as the boundary detection sensor. The pointing apparatus measures and detects the position and the posture, of the real object to determine more precisely the boundary between the virtual world and the real world.

In a still further embodiment of the present invention, when the display area of the display unit is physically separated or remote from the light pointer allowable area where the pointer light beam may be projected, the pointing apparatus enables the user to point to the display area of the display unit and the light pointer allowable area as if they were virtually adjacent and contiguous each other.

That is, when the user moves the pointing position from the display unit to a real object, the cursor disappears upon reaching (or crossing) the boundary of the display area of the display unit and, at the same time, the light pointer appears on the boundary of the light pointer allowable area.

Conversely, when the user moves the pointing position from a real object to the display unit, the light pointer disappears upon reaching (or crossing) the boundary of the light pointer allowable area and, at the same time, the cursor appears on the boundary of the display area of the display unit.

The pointing apparatus according to the present invention recognizes the boundary between the display screen of the display in the virtual world and an object in the real world such as a document. Across that boundary, the pointing apparatus displays the cursor at the instructed point when the user points to a position in the virtual world and projects a light beam to an instructed point when the user points to a position in the real world. The following describes some examples more in detail.

EXAMPLES

FIG. 1 is a diagram showing the configuration of a first embodiment according to the present invention. Referring to FIG. 1, the first embodiment comprises a light pointer 1 capable of projecting a desired-shaped light beam on a real object in the real world at a desired position or in a desired direction, a display 2 on which virtual world objects such as graphical user interfaces or electronic data are displayed, a pointing device 3 manipulated by a user 103 to point to a desired position, light pointer controller 101 for controlling the light pointer 1, and a computer 100 to which the light pointer controller 101, display 2 and pointing device 3 are connected (or communicated) via predetermined interfaces. The computer 100 comprises CPU, memories, disk units and other peripheral devices upon needs.

The light pointer 1 can project a desired-shaped light beam on an object at or onto a desired position or in a desired direction. The light beam should be intensive enough for the user to recognize it.

FIG. 1 shows how the pointer light beam is projected on and around (onto marginal area surrounding) the display 2 just like a spot light. Such devices as a liquid crystal projector using a transmission liquid crystal device or a laser pointer used for presentation may be used for the light pointer 1.

Projecting a desired-shaped light beam with the laser pointer requires a special technique. This technique is not detailed here because it is not related directly to the subject mater of the present invention.

To project a light at a desired position with the laser pointer, the method described in Japanese Patent Publication Kokai JP-A No. Hei 6-149202 (Title of invention "Pointer Display Unit") may be used, the entire disclosure thereof being herein incorporated by reference thereto. That is, two reflecting mirrors each rotating on one axis are used to perform two-dimensional scanning.

The display 2 displays thereon a virtual world created by the computer 100. The virtual world may be, for example, provided by an operating system using a graphical user interface, electronic image data, or a word processor screen. The display 2 may be a CRT (Cathode Ray Tube) display using a cathode-ray tube, a liquid crystal display or the like display means. It may also be a screen on which images are projected by a projector.

The pointing device 3 comprises position data input means, not shown in the figure, for allowing the user to enter data and operation determination means, not shown in the figure, for determining the start or end of a desired operation. The pointing device 3 transfers pointing information generated during user's operation to the computer 100 as necessary. The pointing device 3 is, for example, a mouse used on a personal computer or a joystick.

The computer 100 generates data to be displayed on the display 2 and sends it to the display 2. In addition, the computer 100 processes pointing information from the pointing device 3 and converts it into light pointing information to send it to the light pointer controller (or control means) 101.

In response to the light pointing information from the computer 100, the light pointer controller means 101 controls the intensity of light to be projected from the light pointer 1 and the position, direction and shape of the light to be projected on a real object.

Figure 2:
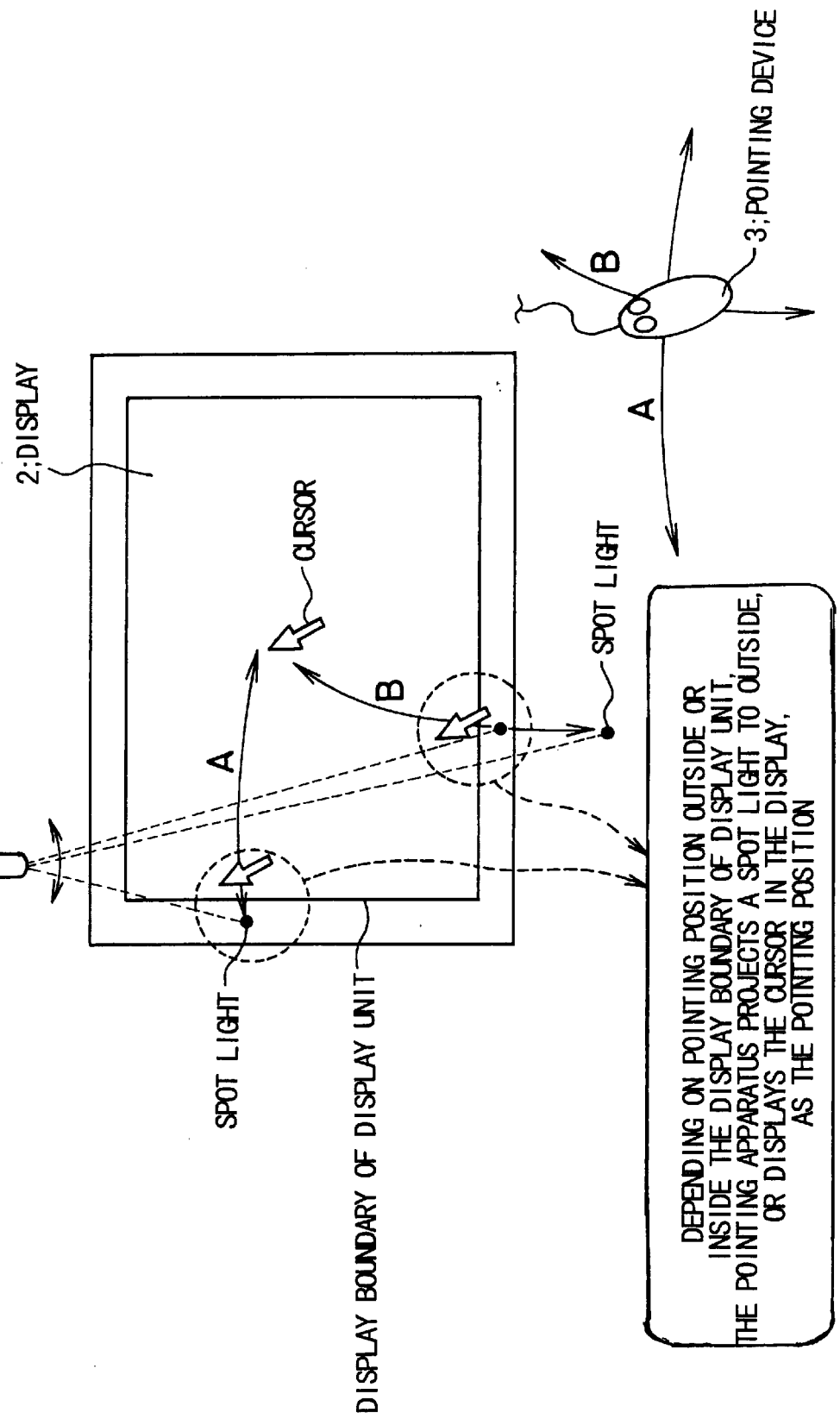
FIG. 2 is a diagram showing how pointing is performed in the first embodiment of the present invention.

FIG. 2 is a diagram illustrating the operation of the first embodiment of the present invention. Referring to FIG. 2, the operation of the first embodiment will be described.

On the display 2 are displayed virtual world information from the computer 100 and the cursor. When the user operates the pointing device 3 in the direction A or B marked by arrows, the cursor moves on the display 2 accordingly in the direction A or B. That is, the user may move the cursor with the pointing device 3 to point to a desired position on the display 2.

When the user moves the cursor to (reaching) the boundary of the display area on the display 2 with the pointing device, the cursor disappears and then (upon further movement crossing the boundary) the light pointer 1 projects the pointer light beam outside the display boundary of the display 2.

The light pointer 1 receives instruction data from the computer 100 via the pointing device 3 and then moves the pointer light according to the movement of the pointing device 3.

Then, the user may point to a desired position in both the virtual world and the real world with the pointing device 3 while watching the cursor in the display area on the display 2 or the pointer light beam outside the display area on the display 2.

Figure 3:
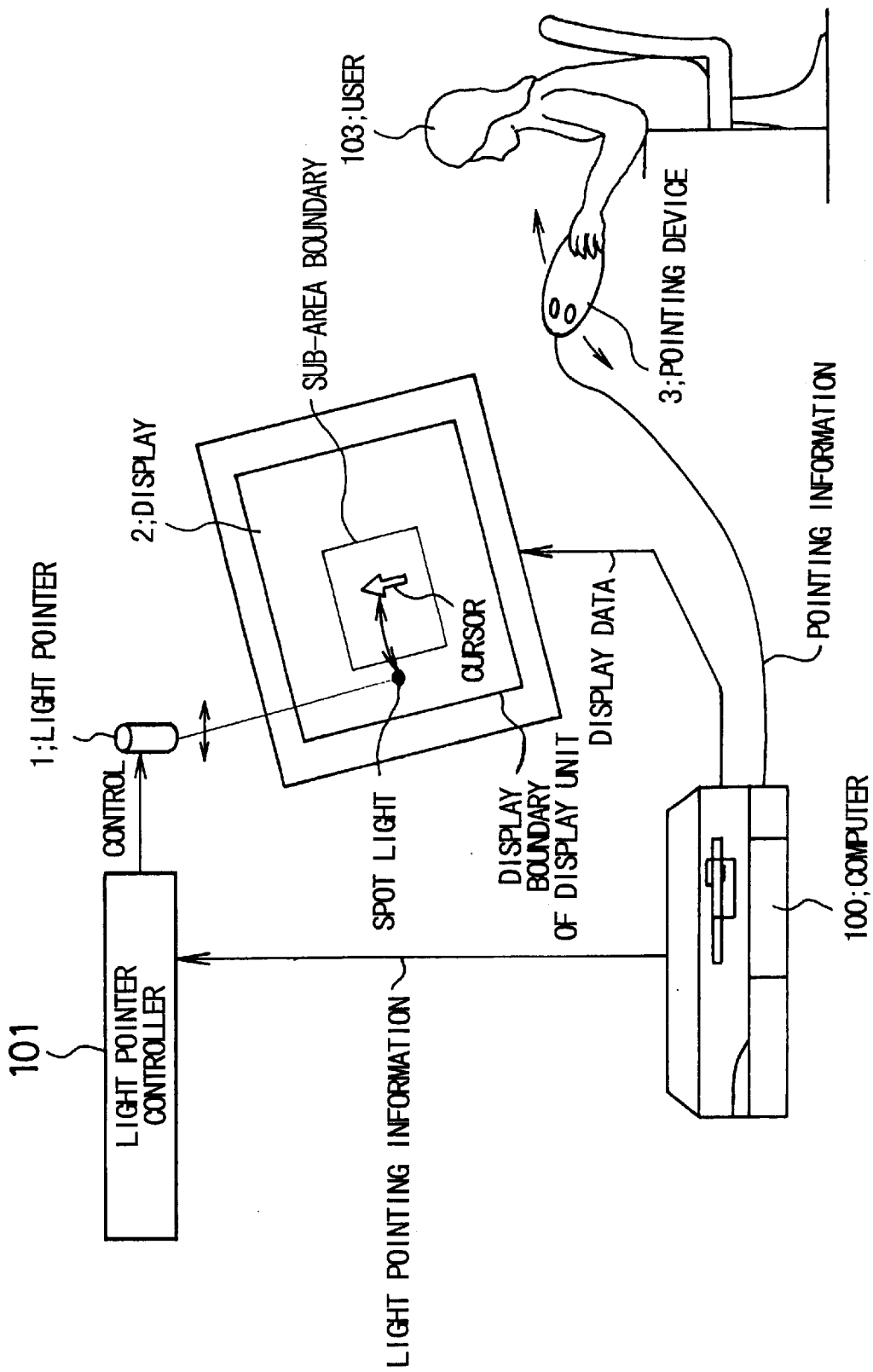
FIG. 3 is a diagram showing the configuration of a second embodiment of the present invention.

FIG. 3 is a diagram showing the configuration of a second embodiment of the present invention. Referring to FIG. 3, a sub-area (sub-area boundary) is set up in the display area on the display 2 in the second embodiment of the present invention. The cursor changes to the pointer light bordering at the boundary of the sub-area, and vice versa. Except this, the configuration and the operation of the second embodiment are similar basically to those of the first embodiment. Namely, when the pointing position moves across the sub-area boundary from the inside thereof toward outside, the cursor changes into a spot light upon crossing the sub-area boundary.

Figure 4:
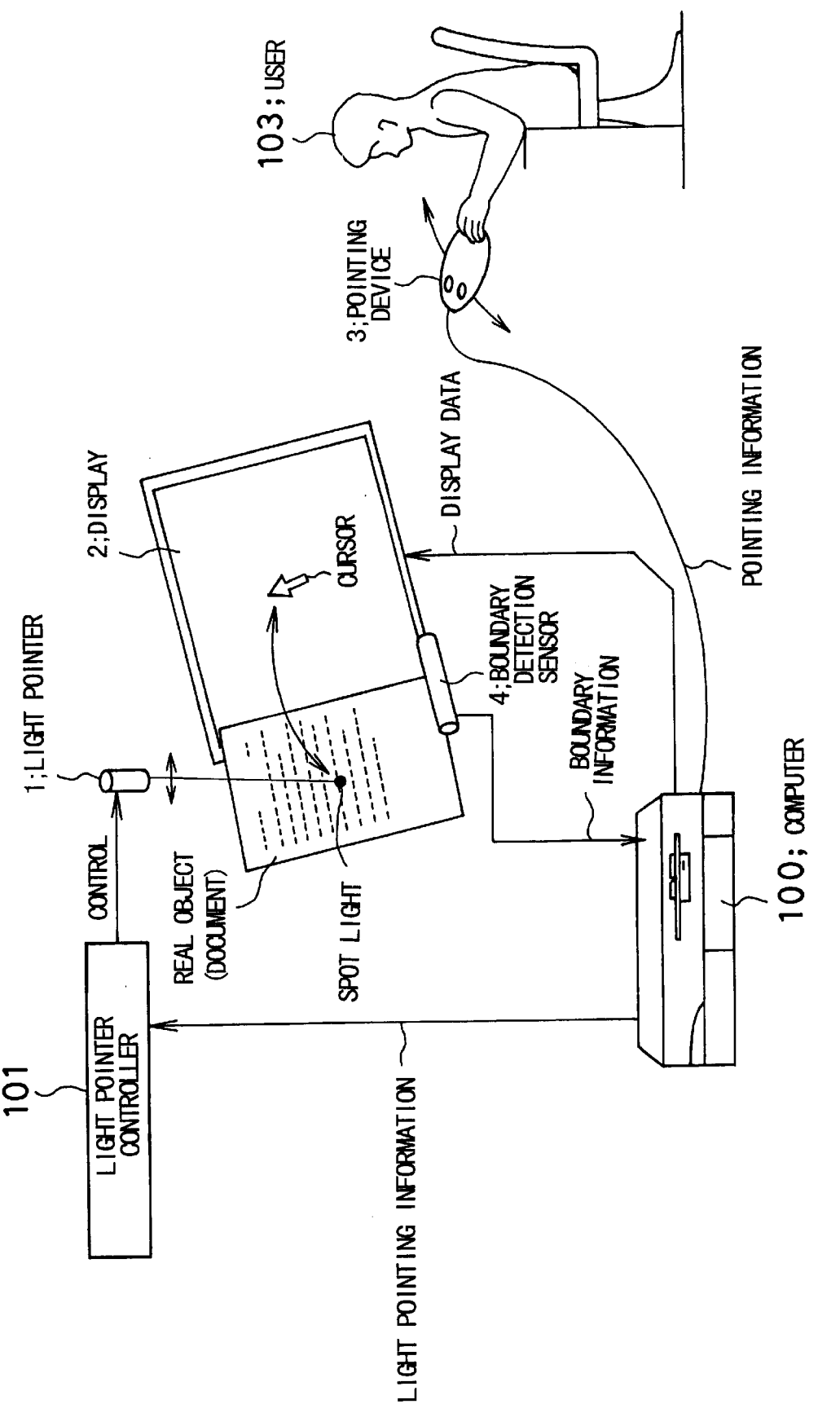
FIG. 4 is a diagram showing the configuration of a third embodiment of the present invention.
Figure 5:
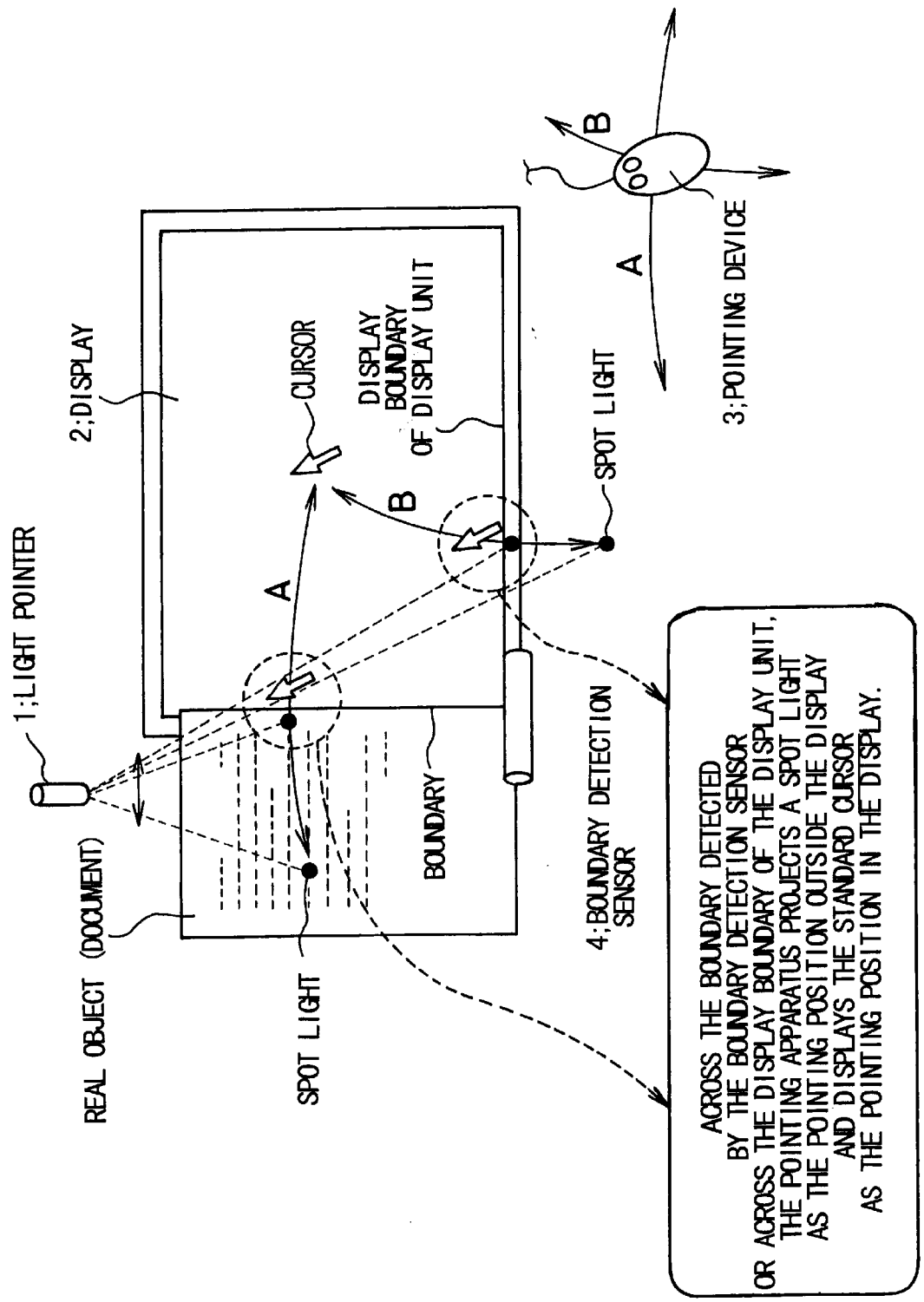
FIG. 5 is a diagram showing how pointing is performed in the third embodiment of the present invention.

FIG. 4 is a diagram showing the configuration of a third embodiment of the present invention. FIG. 5 shows how pointing is performed in the third embodiment of the present invention.

A real object in the real world is overlapped with the display screen of the display 2. In FIG. 4, a document (i.e., paper sheet) is used as an example of real objects.

A boundary detection sensor 4 detects the position of a real object, determines the boundary between the real object and the display screen of the display 2, and sends the boundary information to the computer 100. In response to the pointing information sent from the pointing device 3 and the boundary information sent from the boundary detection sensor 4, the computer 100 generates light pointing information and sends it to the light pointer controller 101. In response to the light pointing information sent from the computer 100, the light pointer controller 101 controls the light pointer 1.

Therefore, when the user moves the pointing device 3 in the direction shown by arrow A in FIG. 5, the user may point to a position on the display 2 with the cursor, and to a position on the real object with the pointer light beam, across the boundary detected by the boundary detection sensor 4.

When the user moves the pointing device 3 in the direction indicated by arrow B, the boundary between the virtual world and the real world is not the boundary detected by the boundary detection sensor 4 but the boundary of the display area on the display 2. Therefore, in this case, the user can point to a position on the display 2 with the cursor, and point to a position on the real object (i.e., here, outside the display area) with the pointer light beam, across the boundary of the display area on the display 2 as in the first embodiment described above.

The detection method of the boundary detection sensor 4 depends on a real object to be detected. For example, when the real object is a document as shown in FIG. 4 or FIG. 5, a photoelectric switch may be provided on the frame of the display 2 to detect whether paper is placed. A one-dimensional or two-dimensional image sensor may also be used. The boundary detection method is not detailed here because it does not relate directly to the subject matter of the present invention.

The boundary detection sensor 4 may be provided in unitary fashion with the light pointer 1, in which the reflected light on the real object display is detected to determine the boundary.

Figure 6:
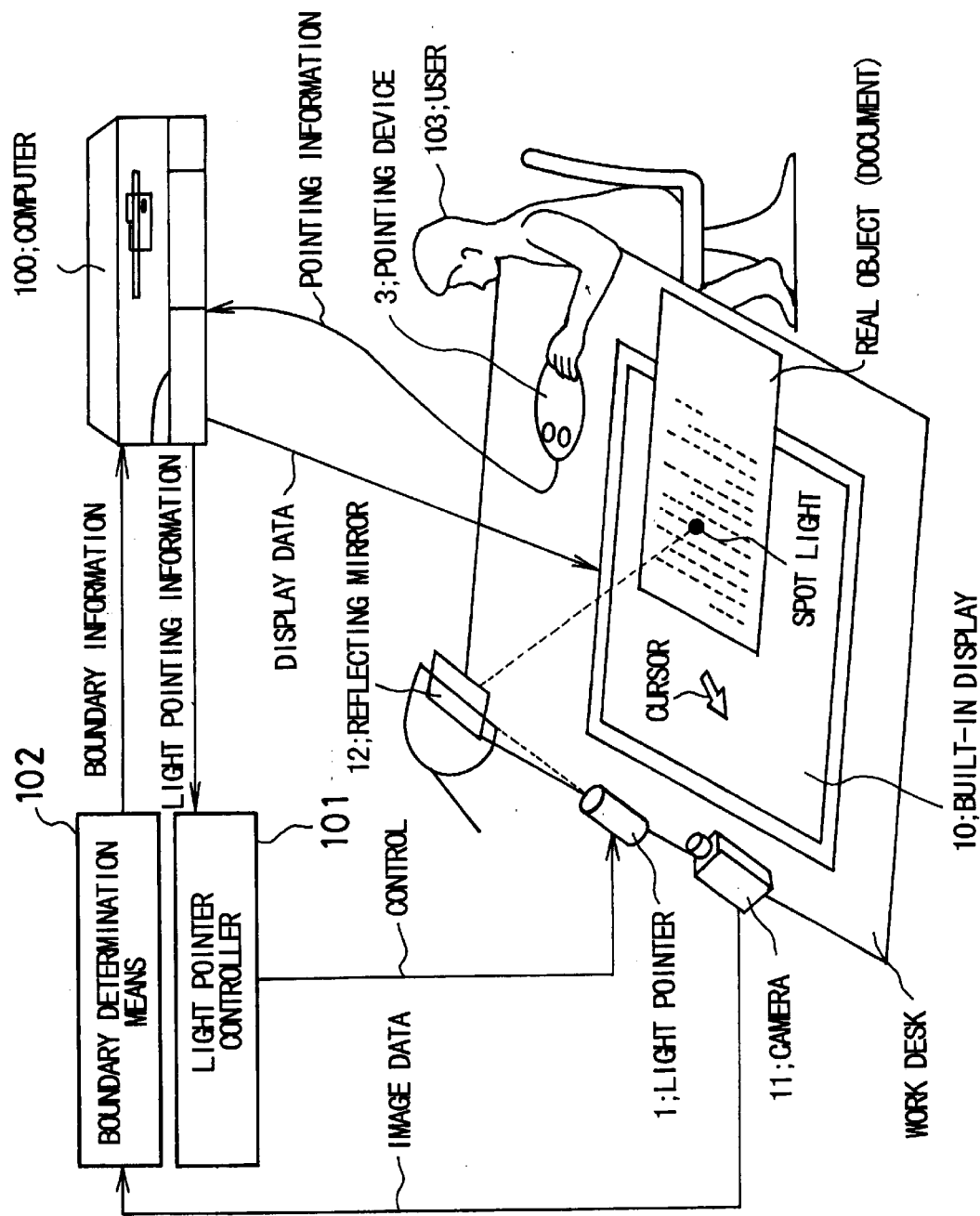
FIG. 6 is a diagram showing the configuration of a fourth embodiment of the present invention.

FIG. 6 is a diagram showing the configuration of a fourth embodiment of the present invention. Referring to FIG. 6, a light pointer 1 capable of projecting a desired-shaped pointer projection light beam at a desired position on the work desk at which the user works, a built-in display 10 built in the working surface of the work desk, a pointing device 3 used to operate the pointer projection light beam projected from the light pointer 1 and the position of the cursor on the built-in display 10, a camera 11 capable of monitoring objects on the work desk, a reflecting mirror 12 provided on the work desk, light pointer controller 101 for controlling the light pointer 1, boundary determination means 102 for determining the boundary between the display screen of the built-in display 10 and the document on the work desk based on image data sent from the camera 11, and a computer 100 controlling the whole system.

The built-in display 10 may be a liquid crystal display or a projection-type projector built in the work desk.

The operation of this embodiment will be described. The camera 11 takes the picture of the work desk, especially, the display area of the built-in display 10, via the reflecting mirror 12 and transfers image data to the boundary determination means 102. The boundary determination means 102 processes the image data sent from the camera 11. When there is a real object such as a document in the display area of the built-in display 10, the boundary determination means 102 extracts the contour (profile) of the real object, determines the boundary between the real object and the built-in display 10, and sends the boundary information to the computer 100.

The computer 100 moves the pointing position according to the pointing information sent from the pointing device 3 operated by a user 103. At the same time, in response to the boundary information sent from the boundary determination means 102, the computer 100 controls so that either the cursor is displayed when a position in the display area of the built-in display 10 is pointed, or the pointer projection light is projected when a position on the real object is pointed. The light pointer 1 projects a light beam on the work desk through the reflecting mirror 12.

The boundary determination means 102 extracts the contour (profile) of the real object, that is, the boundary between the built-in display 10 and the real object, as described below. Boundary extraction may be performed, for example, by assigning marks on the real object and then by measuring the mark positions and posture.

Because the computer 100 is capable of controlling the display of the built-in display 10, the computer 100 may display the real object in such a way that its contour may be extracted in an easily extractable fashion only when the camera 11 takes a picture in order to extract the boundary precisely.

The way in which the 102 extracts boundaries is not detailed here because it is not related directly to the subject matter of the present invention. Known technologies may be used as long as boundaries are extracted by limiting real objects to those assumed to be used. In this regard, all the documents relating to the boundary determination mentioned in the background art are referred to herein by reference thereto.

In this embodiment, a light beam is projected by the light pointer 1, and the work desk is photographed by the camera 11, through the reflecting mirror 12. However, the reflecting mirror 12 is not necessarily needed if the light pointer 1 and the camera 11 are placed above the work desk in an appropriate position and an appropriate direction, respectively. The configuration shown in FIG. 6 allows the light pointer 1 and the camera 11 to be built in the work desk, thus making the system compact.

Figure 7:
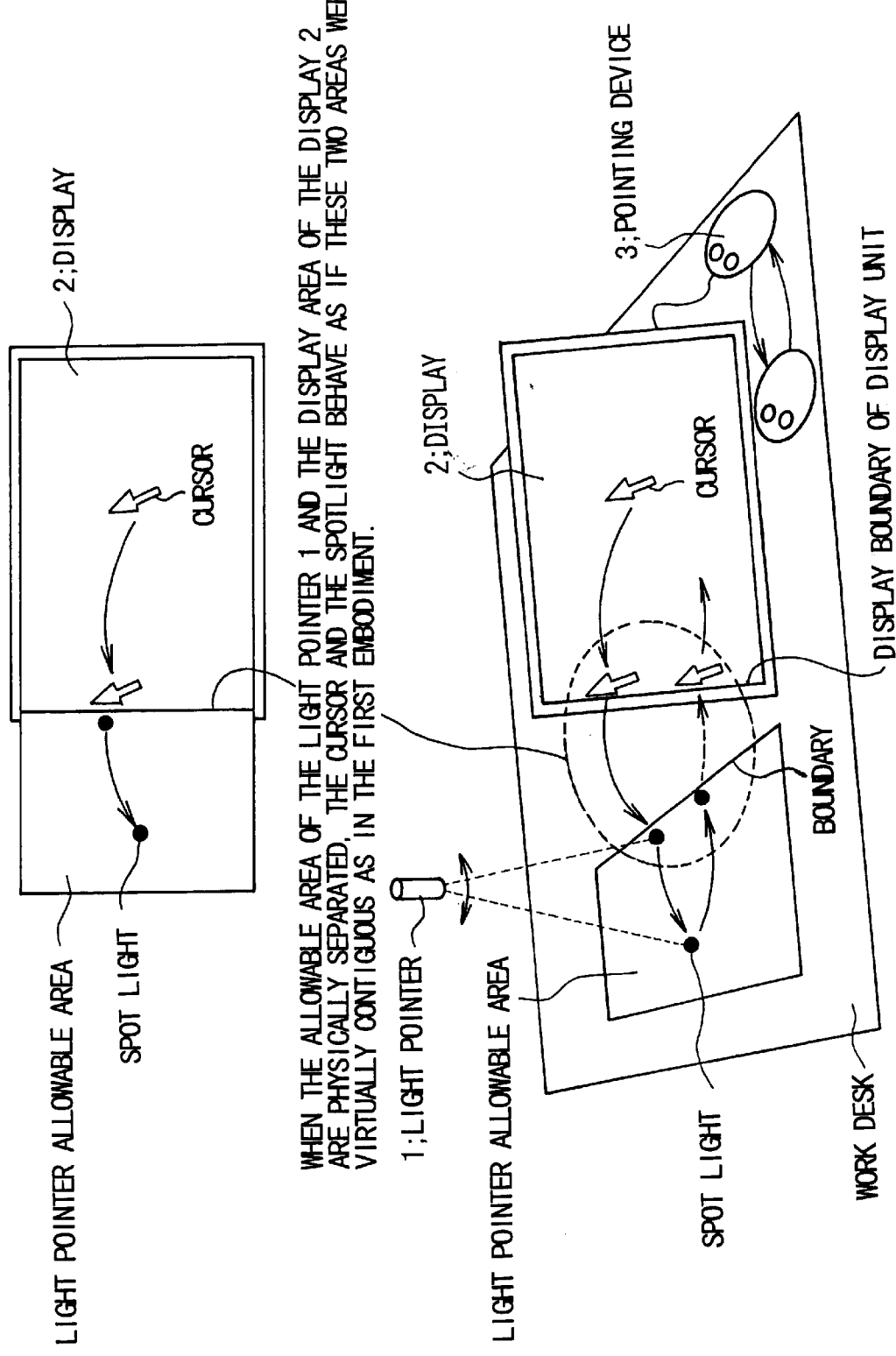
FIG. 7 is a diagram showing how pointing is performed in the fifth embodiment of the present invention.
Figure 8:
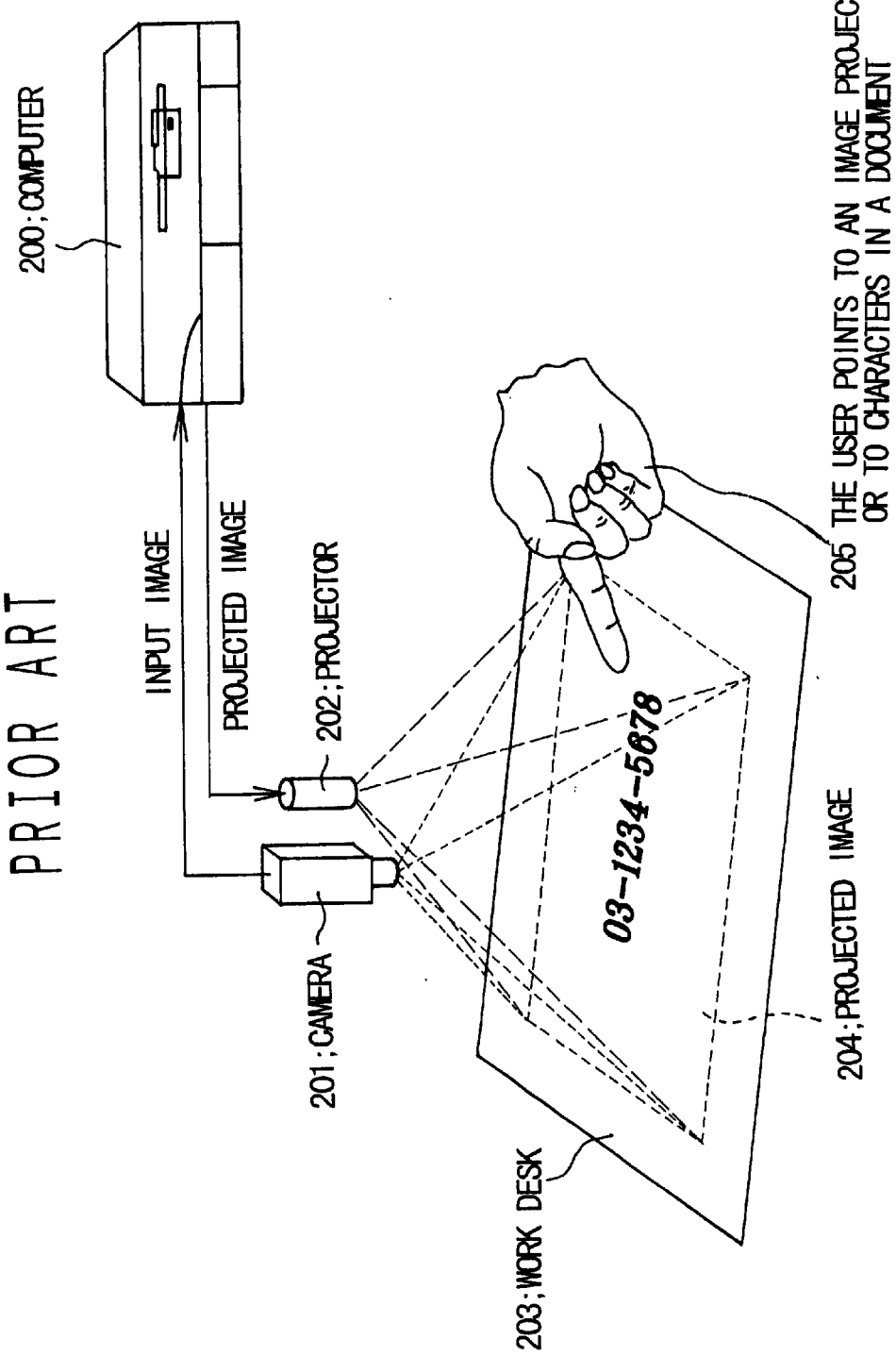
FIG. 8 is a diagram showing the configuration of Digital Desk.
Figure 9:
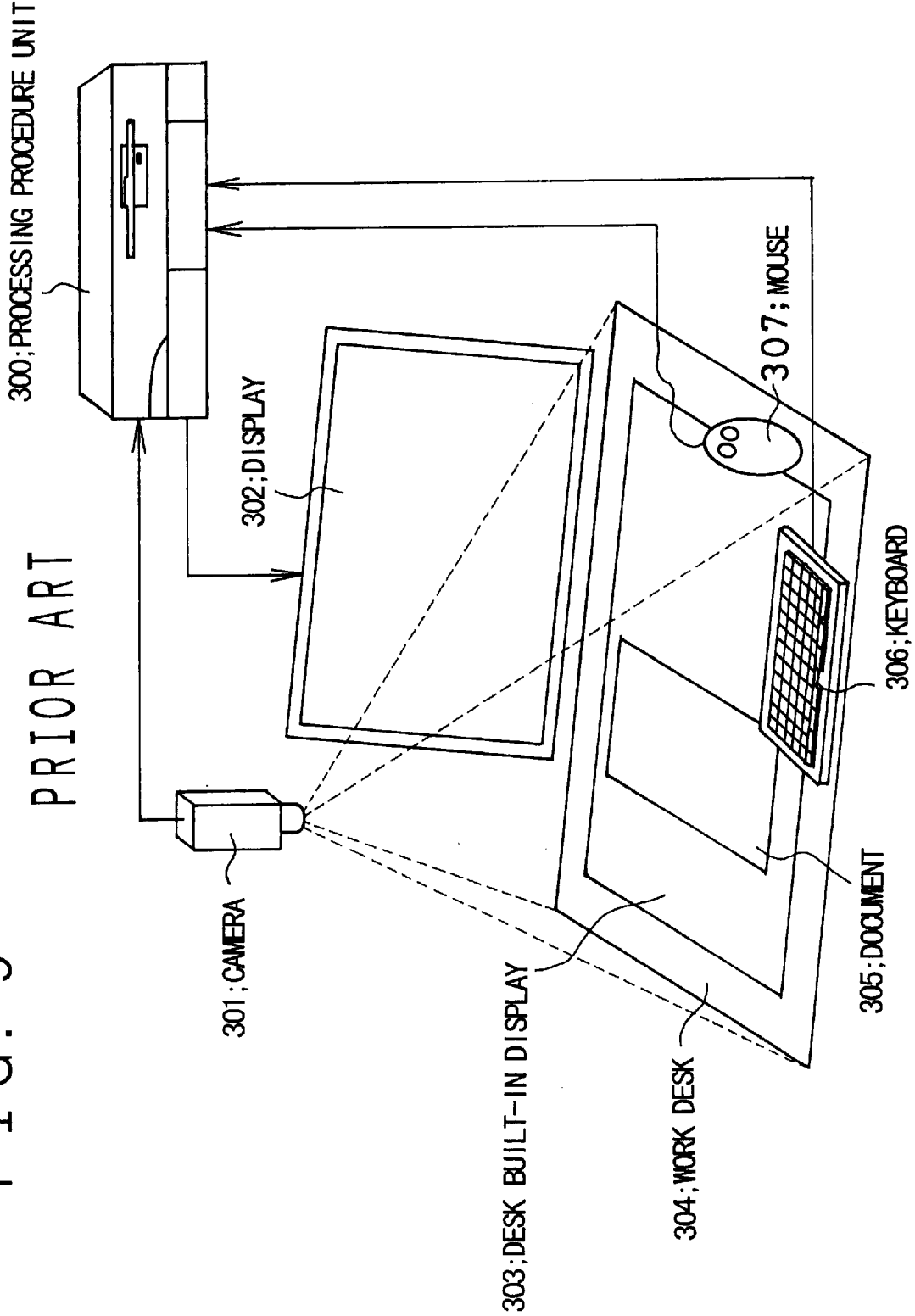
FIG. 9 is a diagram showing the overall configuration of InteractiveDESK.
Figure 10:
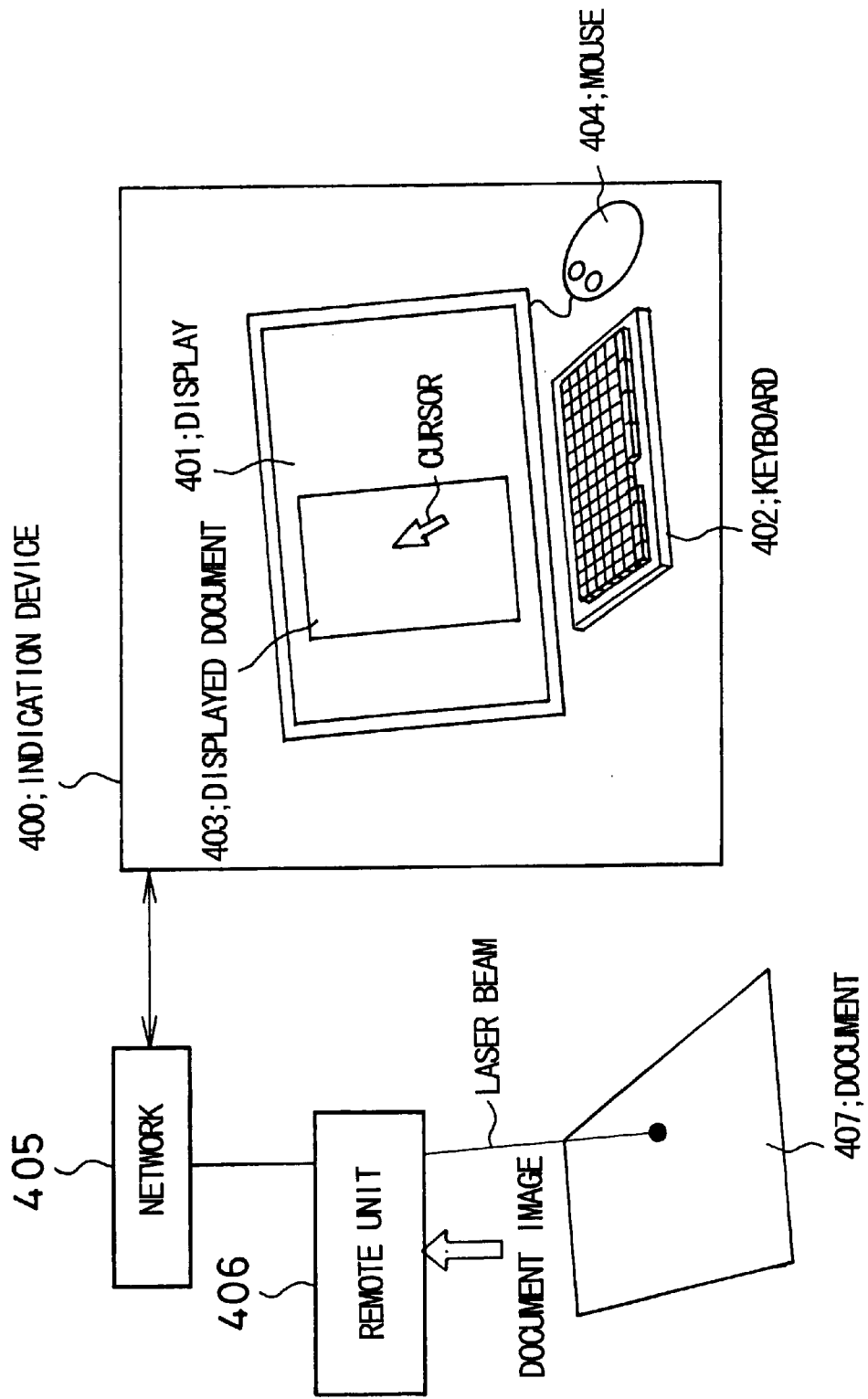
FIG. 10 is a diagram showing a part of the system configuration described in Japanese Patent Publication Kokai JP-A No. Hei 9-46776.
Figure 11:
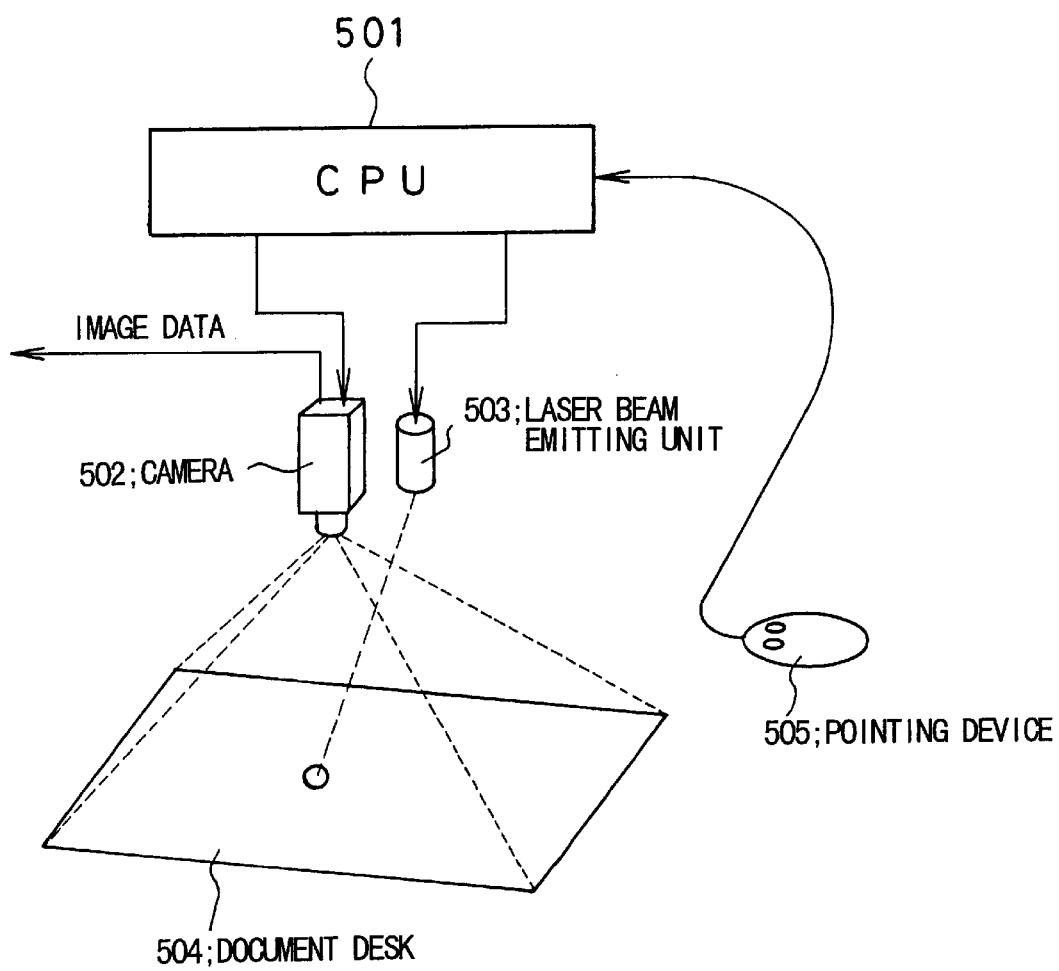
FIG. 11 is a diagram showing a part of the system configuration described in Japanese Patent Publication Kokai JP-A No. Hei 9-83705.

FIG. 7 is a diagram showing the configuration of a fifth embodiment of the present invention and how pointing is performed.

Referring to FIG. 7, the display area of the display 2 on which virtual world information is displayed is physically separated from the light pointer allowable area in which the light pointer 1 may projects a light.

As shown in FIG. 7, there is a display 2 and a pointing device 3 on the work desk where the user works. The light pointer may project the light beam in a specific area on the work desk, that is, in the light pointer allowable area. In this embodiment, the display area of the display 2 and the light pointer allowable area are physically separated instead of being overlapped. Thus, there is no need to provide a boundary detection sensor 4 or camera 11 as in the first to fourth embodiments.

Next, how the cursor or the pointer light moves when the user controls it with the pointing device 3 will be described.

First, assume that the user is pointing to a location on the display screen of the display 2. At this time, the cursor appears in the pointing position. When the user moves the cursor to the left with the pointing device 3 in FIG. 7 until the cursor reaches the leftmost end of the display area of the display 2, the cursor disappears. At the same time, the pointer projection light appears in a position (e.g., the rightmost position) of the light pointer allowable area and, as the user moves the pointing device 3, the pointer projection light also moves.

Conversely, when the user moves the pointer projection light to the right with the pointing device 3 in FIG. 7 until the pointer projection light reaches the rightmost end of the light pointer allowable area, the pointer projection light disappears. At the same time, the cursor appears in the leftmost position of the display area of the display 2 and, as the user moves the pointing device 3, the cursor also moves.

As described above, even when the display area of the display 2 is physically separated from the light pointer allowable area, it is possible to continue the pointing operation as if they were contiguous.

Although the light pointer allowable area is rectanglar in FIG. 7, it is not limited to this shape. For example, it may be a circle or an ellipse. However, because the display area of the display 2 is rectanglar in most cases, it is difficult to make the display area of the display 2 geometrically contiguous to a non-rectangular shape. However, based on appropriate conversion, it is possible to preliminary determine the behaviors of the cursor and pointer projection light on and around the boundary to make pointing operation easy to be understood by the user.

As described above, the present invention has the following advantages:

The first advantage is that the configuration in which the user can point to the objects inside and outside of the display area of the display unit with one pointing device allows the user to point to a position on the display in the virtual world and to a real object in the real world. Even when pointing to both the virtual world and the real world frequently, the ability to perform the pointing operation with a single pointing device makes it possible to perform the pointing operation quickly.

The second advantage of the present invention is that the use of devices, such as a boundary detection sensor and a camera, makes possible a correct, easy to understand pointing operation even when real objects overlap with the display or even when the light pointer allowable area is physically separated from the display area of the display, ensuring high productivity.

The third advantage is the present invention may be implemented simply by modifying an existing personal computer system or workstation system configuration. Only the light pointer and its control means need be added. Of course, operations performed only in the virtual world, such as word processing, may be performed in the embodiments of the present invention.

It should be noted that other objects and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A pointing apparatus comprising:

a light pointer projecting a desired-shaped light beam on a position on an object;

a display unit on which desired information is displayed;

a pointing device of pointing to a desired position on a display screen of said display unit; and a data processing unit controlling said light pointer, said display unit and said pointing device, wherein, (a) when the position pointed by said pointing device is in a display area of said display unit, said pointing apparatus displays a cursor at the pointed position in the display area of said display unit and, (b) when the position pointed by said pointing device is in an area other than the display area of said display unit, said pointing apparatus controls said light pointer to project said desired-shaped light beam to in the pointed position.

2. The pointing apparatus as defined by claim 1, further comprising a sub-area within a display area of said display unit, wherein, when the position pointed by said pointing device is in said sub-area, said pointing apparatus displays the cursor at the pointed position on said display unit and wherein, when the position pointed by said pointing device is in an area other than said sub-area, said pointing apparatus controls said light pointer to project said desired-shaped light beam in the pointed position.

3. The pointing apparatus as defined by claim 1, further comprising a boundary detector which detects a boundary of an object, wherein, when the position pointed by said pointing device is on said object, said pointing apparatus controls said light pointer to project said desired-shaped light beam in the pointed position, and wherein, when the position pointed by said pointing device is not on said object but in the display unit of said display unit, said pointing apparatus displays the cursor on the display screen on said display unit.

4. The pointing apparatus as defined by claim 3, wherein said boundary detector comprises:

a camera taking a picture of the object; and boundary position determination means for processing image data captured by said camera and determining the boundary of said object.

5. The pointing apparatus as defined by claim 1 wherein the display screen of said display unit and a working surface of a working desk where a user works are on the same surface.

6. The pointing apparatus as defined by claim 1, wherein, when a light pointer allowable area where said light pointer is able to project a light beam is physically remote from the display area where said display unit is able to display data, said pointing device performs pointing as if said light pointer allowable area and said display area of the display unit were virtually contiguous.

7. The pointing apparatus as defined by claim 2, wherein, when a light pointer allowable area where said light pointer is able to project a light beam is physically remote from the display area where said display unit is able to display data, said pointing device performs pointing as if said light pointer allowable area and said display area of the display unit were virtually contiguous.

8. The pointing apparatus as defined by claim 3, wherein, when a light pointer allowable area where said light pointer is able to project a light beam is physically remote from the display area where said display unit is able to display data, said pointing device performs pointing as if said light pointer allowable area and said display area of the display unit were virtually contiguous.

9. The pointing apparatus as defined by claim 1, further comprising light pointer controller, connected to said data processing unit, that controls intensity of the light beam projected by said light pointer and a position, direction, and shape of the light beam projected on a real object in response to pointing information sent from said data processing unit.

10. A pointing apparatus comprising:

a display unit;

a data processing unit connected to said display unit and controlling display output;

a light pointer projecting a desired-shaped light beam on a position on an object;

light pointer controller, connected to said data processing unit, that controls intensity of the light beam projected by said light pointer and a position, direction, and shape of the light beam projected on a real object in response to pointing information sent from said data processing unit; and a pointing device used for pointing to the desired position on a display screen of said display unit, said pointing device comprising an input device connected to said data processing unit, wherein, when the position pointed by said pointing device is in a predetermined display area of said display unit, said pointing apparatus displays a cursor at the pointed position in the display area of said display unit, wherein, (a) when the position pointed by said pointing device exceeds an end of said display area of said display unit and gets out of the area, said light pointer controller causes said light pointer to project a light beam to a position outside said display area of said display unit and pointed by said pointing device, and wherein, (b) when the position pointed by said pointing device enters said predetermined display area of said display unit again, said pointing apparatus displays the cursor at the pointed position in the display area of said display unit.

* * * * *